United States Patent
Coogan

(10) Patent No.: US 9,605,856 B2
(45) Date of Patent: Mar. 28, 2017

(54) AIR PRESSURE CONTROL SYSTEM AND METHOD

(75) Inventor: James J. Coogan, Des Plaines, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 2687 days.

(21) Appl. No.: 11/712,822

(22) Filed: Mar. 1, 2007

(65) Prior Publication Data

US 2007/0207724 A1    Sep. 6, 2007

Related U.S. Application Data

(60) Provisional application No. 60/778,350, filed on Mar. 2, 2006.

(51) Int. Cl.
*F24F 11/00* (2006.01)
*G05D 16/20* (2006.01)

(52) U.S. Cl.
CPC ........ *F24F 11/0001* (2013.01); *G05D 16/208* (2013.01); *F24F 2011/0004* (2013.01); *F24F 2011/0005* (2013.01); *F24F 2011/0038* (2013.01); *F24F 2011/0041* (2013.01)

(58) Field of Classification Search
CPC .................................................. F24F 11/0001
USPC .............. 454/238, 229, 255, 49–67; 422/104
See application file for complete search history.

(56) References Cited

U.S. PATENT DOCUMENTS

| | | | |
|---|---|---|---|
| 5,115,728 A * | 5/1992 | Ahmed et al. | 454/61 |
| 5,240,455 A * | 8/1993 | Sharp | B08B 15/023 454/343 |
| 5,350,113 A * | 9/1994 | Coogan | 236/13 |
| 5,385,505 A * | 1/1995 | Sharp et al. | 454/238 |
| 5,435,779 A * | 7/1995 | Sharp | B08B 15/023 454/238 |
| 5,545,086 A * | 8/1996 | Sharp et al. | 454/238 |
| 5,720,658 A * | 2/1998 | Belusa | 454/238 |
| 5,863,246 A * | 1/1999 | Bujak, Jr. | F24F 3/0442 165/212 |
| 6,033,302 A * | 3/2000 | Ahmed et al. | 454/238 |
| 6,192,922 B1 * | 2/2001 | MacGibbon et al. | 137/486 |
| 6,219,590 B1 * | 4/2001 | Bernaden et al. | 700/277 |
| 2003/0104778 A1 * | 6/2003 | Liu | 454/61 |
| 2003/0207662 A1 * | 11/2003 | Liu | B08B 15/002 454/61 |

OTHER PUBLICATIONS

Wei Sun, PE, "Quantitative Multistage Pressurizations in Controlled and Critical Environments," ASHRAE Transactions: Symposia, pp. 759 to 769, Copyright 2004.
Siemens Building Technologies, Inc, "Room Pressurization Control," 125-2412 Rev. 2, Jun. 2004, Copyright 2001.

* cited by examiner

*Primary Examiner* — Avinash Savani
*Assistant Examiner* — Vivek Shirsat

(57) ABSTRACT

A pressurization control system configured to regulate air pressure with a space includes an air supply source fluidly coupled to a damper, a room controller configured to provide a control signal to the damper. The room controller includes a flow controller configured to generate a flow feedback signal, and a pressure controller configured to generate a pressure feedback signal, wherein the room controller is configured to receive flow and pressure feedback signals and generate the control signal based on one or more of the received flow and pressure feedback signals.

20 Claims, 4 Drawing Sheets

AIR PRESSURE CONTROL SYSTEM AND METHOD

PRIORITY CLAIM

This patent claims the priority benefit provided under 35 U.S.C. §119(e) to U.S. provisional patent application Ser. No. 60/778,350, filed on Mar. 2, 2006. The content of this provisional patent application is incorporated herein by reference for all purposes.

BACKGROUND

It is known to control and monitor the pressurization of a room and/or laboratory to ensure occupant health and safety, as well as to protect sensitive manufactured products. Healthcare facilities and research laboratories may utilize complex pressurization schemes in order to protect patients, personnel and researchers from hazardous viruses, pathogens, or other toxins. For example, a healthcare or research facility may seal and partially depressurize (generate a negative static pressure) a room or laboratory that contains a hazardous material. Thus, if a breach or accident occurs air would flow towards the hazardous material thereby containing and/or minimizing the potential spread or contamination.

Biological laboratories are often maintained at a negative static pressure specifically to prevent airflow out of the laboratory room. These laboratories rooms are constructed and classified as biosafety level 1, 2, 3 and 4 based on, for example, the nature and danger associated with the work and materials housed within the laboratory. Biosafety Level 4 (BSL-4) is the highest safety level classification indicating the greatest risk to individuals within a laboratory itself, the facility in which the laboratory is housed, and the surrounding areas. BSL-4 rated laboratories are constructed to be virtually leakproof, e.g., they are sealed so tightly that virtually no unintended air transfer or release occurs, to minimize the chance of contaminants escaping the laboratory. Alternatively, a BSL-4 rated laboratory could be a sealed room or enclosure into which another sealed, air tight container is placed. Regardless, BSL-4 rated laboratories are typically geographically isolated and operated at a high negative static pressure, e.g., 0.1 to 0.5 inches w.c. or 25 to 125 Pa, in an effort to control or prevent the spread of a hazardous contaminants.

In order to ensure and control the airflow and ventilation within a BSL-4 rated laboratory, the mechanical ventilation system(s) supplying the laboratory will typically be designed and controlled to deliver desired airflow rates and maintain selected pressure relationships between the laboratory and adjacent spaces. Certain pressure relationships must be maintained or controlled during transient conditions such as, for example, changes in pressure caused by the opening of a door or entrance. Known laboratory pressurization schemes such as, for example, differential flow control or airflow tracking are inapplicable in leakproof and/or sealed environments such as a BSL-4 rated laboratory where the relative supply and exhaust airflows are constant and may not be independently adjusted to establish a pressure differential. Similarly, direct pressure control and cascade pressure are unsuitable for tightly sealed environments where the transient conditions can severely and rapidly impact the desired pressure relationship.

There exists a need for a pressurization scheme or strategy that may be utilized in a tightly sealed environment such as, for example, a BSL-4 rated laboratory, to achieve and maintain a specific pressure relationship.

BRIEF DESCRIPTION OF THE FIGURES

Additional features and advantages of the present embodiments are described in, and will be apparent from, the following Detailed Description and the figures.

DETAILED DESCRIPTION

In order to maintain a desired pressure or pressure differential within a pressure controlled room or laboratory, it may be desirable to implement a pressure control system that utilizes incremental damper and/or feedback controls. Moreover, it may be desirable to design and implement the pressure control system to include a single damper or valve in order to reduce the cost and complexity of the overall system.

I. System Configuration

Figure 1:
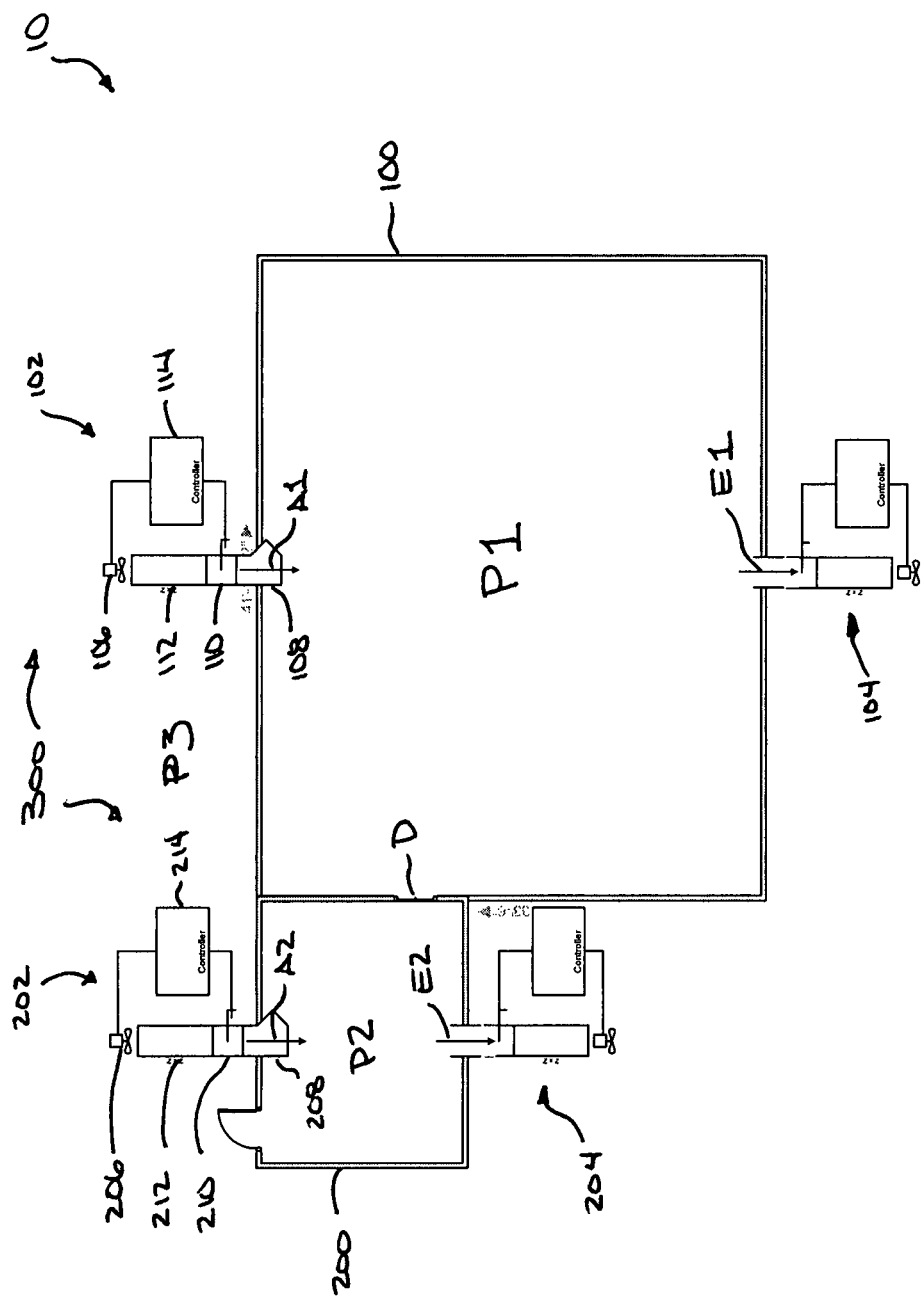
FIG. 1 illustrates an embodiment of a laboratory in a first airflow configuration that utilizes the pressure control system disclosed herein.

FIG. 1 illustrates one building layout 10 that may implement a pressure control system disclosed herein. The building layout 10 includes a room or laboratory 100 adjoined to a second room or airlock 200 via a sealable doorway D. The laboratory 100 may include an air delivery system 102 fluidly coupled to an exhaust 104. The air delivery system 102 and the exhaust 104, in this exemplary embodiment, may be configured to generate a first negative pressure P1 in the laboratory 100. The laboratory 100 may be a "leakproof" or otherwise sealed room in compliance with BSL-4 safety standards. In other embodiments, the laboratory 100 or other room may be sealed or have airflow regulated in compliance with other standards or specifications.

The airlock 200, similar to the laboratory 100, may include an air delivery system 202 fluidly coupled to an exhaust 204. The air delivery system 202 and the exhaust 204, in this exemplary embodiment, may be configured to generate a second negative pressure P2 in the airlock 200.

In the present example, the environs (generally indicated by the reference identifier 300) surrounding the laboratory 100 and airlock 200 will be assumed to be maintained or generally at a third negative pressure P3. Moreover, as used throughout this exemplary embodiment, the pressure gradients between the three rooms or areas increase, e.g., become more negative, based upon proximity to the laboratory 100. For example, the air pressure at a non-hazardous point in the building selected as the pressure reference, the third negative pressure P3 may be −25 Pa in the environs 300, the second negative pressure P2 may be −50 Pa in the airlock 200, and the first negative pressure P1 may be −75 Pa in the laboratory 100. Thus, if a leak or emergency occurs in the laboratory 100, the risk of contamination or escape of dangerous materials will be reduced because the pressure gradient will draw the air (and potential hazards) within the environs 300 and airlock 200 towards the laboratory 100. In other words, in this configuration, air flows from areas of higher pressure, e.g., areas having less negative pressure, towards the partial vacuum within areas of lower pressure, e.g., areas that have a more negative pressure relative to the air source.

The air delivery system 102 and the exhaust 104 may be autonomous and/or isolated from the air delivery system 202 and the exhaust 204. Isolation of the two air delivery systems 102, 202 and/or exhausts 104, 204 may be desirable in order to prevent cross-contamination of the two systems, limit the possibility of a simultaneous shutdown due to a system failure, and allow for independent control of the airlock 200 and laboratory 100. Alternatively, the air delivery system 102 and the exhaust 104 may be interconnected and/or fluidly coupled to the air delivery system 202 and the exhaust 204. These systems may be coupled, e.g., share a common air source and/or controller, to reduce the overall cost and complexity of the pressure control system.

In the present example, the air delivery system 102 and the exhaust 104 are isolated from the air delivery system 202 and the exhaust 204. The air delivery system 102 includes an air supply source 106 fluidly coupled to an air outlet 108 via a damper 110. The air supply source 106 may be, for example, a propeller fan, a centrifugal fan, an air compressor or any other air movement or pressure generation device. The damper 110 may be a moveable or positionable valve or diaphragm positioned to control the air flow (indicated by the arrow A1) through a duct 112 connecting the air supply source 106 to the air outlet 108. The air within the laboratory 100 fluidly couples the air outlet 108 and air supply source 106 to exhaust air flow E1 through the exhaust 104. The exhaust air flow E1, in turn, pulls the air within the laboratory 100 from the room. As illustrated in FIG. 1, the exhaust E1 may have similar and/or identical componentry as the air delivery system 102. The differential between the amount or flow of air provided via the air flow A1 and removed from the exhaust air flow E1, e.g., removing more air than is provided, generates the negative or vacuum pressure P1 within the laboratory 100. Pressure and flow sensors (not shown) may be positioned throughout the laboratory 100, at the air outlet 108 and/or the exhaust 104 to measure the pressure, air flow and air flow differential within or through the laboratory 100.

A room controller or controller 114 may be in communication with the air delivery system 102 and the exhaust 104 to control the air flow A1 and exhaust air flow E1, respectively, within the laboratory 100. Alternatively, separate controllers 114 may be in communication with the air delivery system 102 and the exhaust 104 to thereby allow independent control of these air handling systems. In particular, the controller 114 may utilize a processor (not shown) to execute control routines or programs stored on a computer readable medium or memory (not shown). The control routines may, in turn, calculate or otherwise determine the volume or amount of air to be provided by the air supply source 106. Alternatively, or in addition to, the control routines may calculate or determine the position of the damper 110 necessary to achieve a desired air flow A1.

Similarly, the air delivery system 202 and the exhaust 204 includes an air supply source 206 fluidly coupled to an air outlet 208 via a damper 210. The air supply source 206 may be, for example, the same type or style of air supply source 106 or may be a different source or generation system. The damper 210 may be positionable to control the air flow A2 through a duct 212 connecting the air supply source 206 to the air outlet 208. The air within the airlock 200 fluidly couples the air outlet 208 and air supply source 206 to exhaust air flow E2 through the exhaust 204. Similar to the laboratory 100, pressure and flow sensors (not shown) may be positioned throughout the airlock 200 to provide readings and measurements to a room controller or controller 214. The controller 214 may be in communication with the air delivery system 102 to control the air flow A1 and exhaust air flow E1 within the airlock 200.

Figure 2:
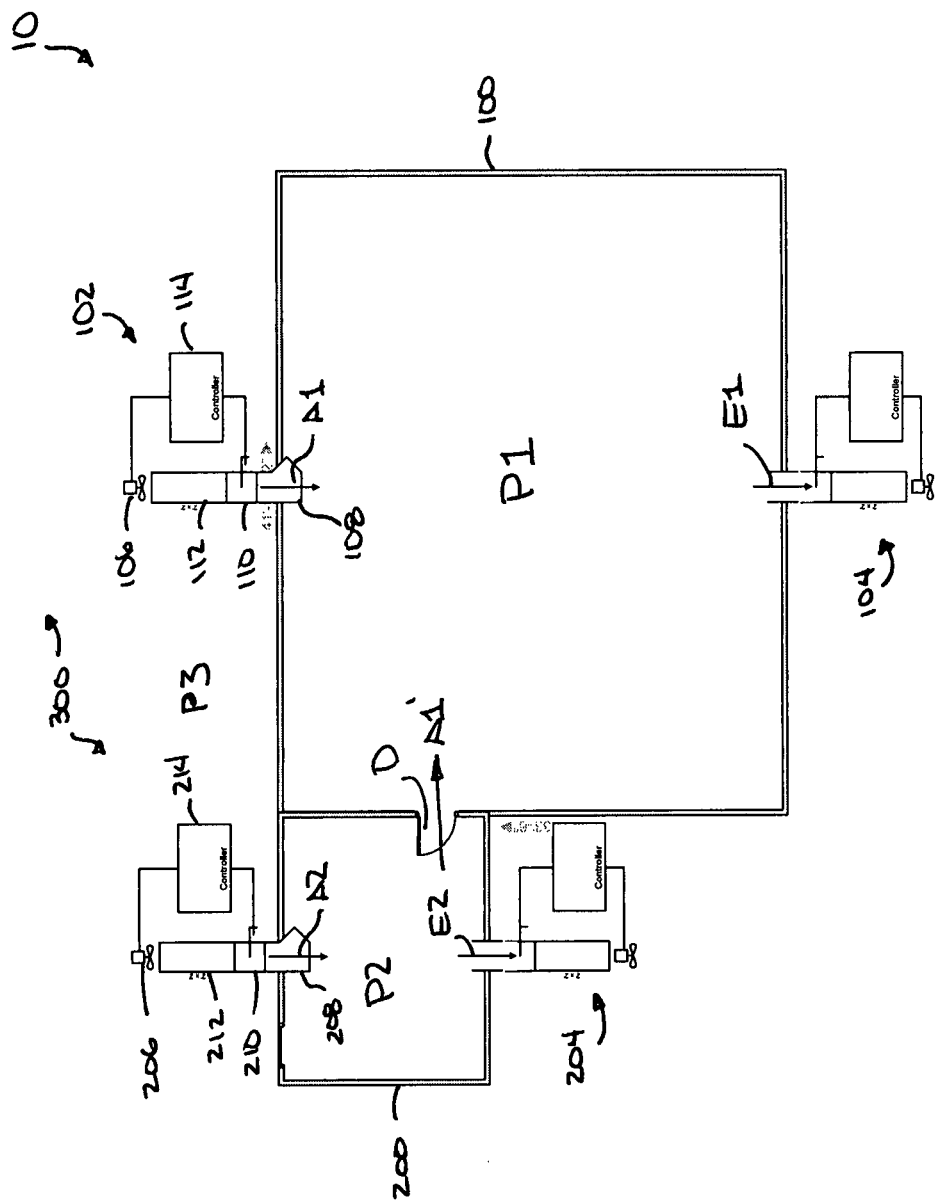
FIG. 2 illustrates an embodiment of the laboratory in a second airflow configuration that utilizes the pressure control system disclosed herein.

FIG. 1 further illustrates a steady state condition in which the laboratory 100 is sealed and the air delivery system 102 and exhaust 104 are operating independently from the airlock 200 and environs 300. In particular, in this situation the doorway D is closed, thereby preventing additional, higher pressure air, from the airlock 200 from uncontrollably flowing into or entering the laboratory 100. FIG. 2 illustrates a transient condition in which the doorway D is open or otherwise providing an additional airflow A1' to the laboratory 100 in an uncontrolled manner. For the purposes of the examples discussed herein, the additional airflow A1' is assumed to be a constant airflow and not a variable airflow adjusted by the controller 214.

II. System Operation

Figure 3:
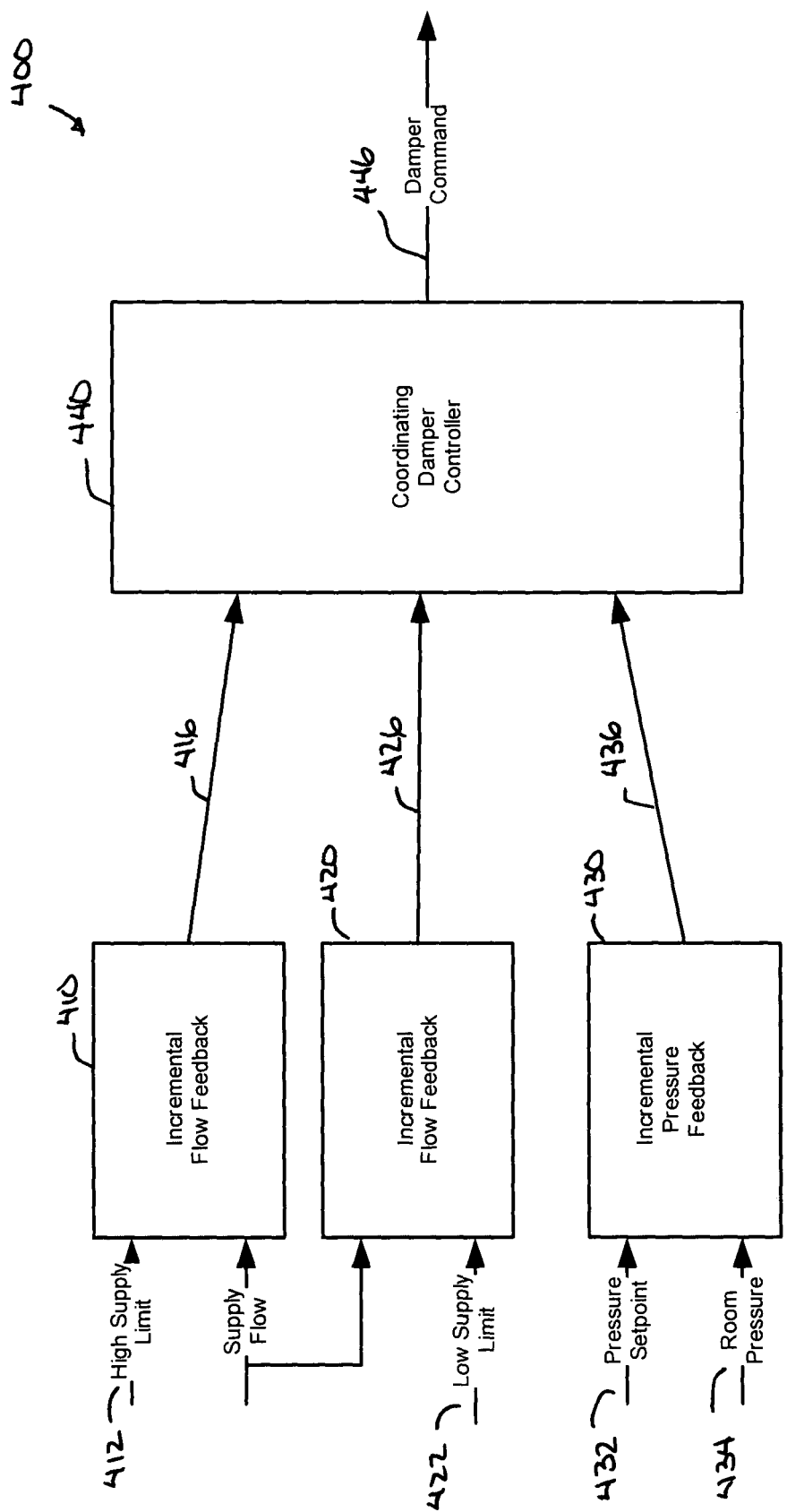
FIG. 3 illustrates a block diagram of a control scheme that may be utilized by a controller in one example.

FIG. 3 illustrates a room pressurization control routine 400 that may be implemented by the controller 114 (or the controller 214). The room pressurization control routine 400 utilizes multiple control schemes or mechanisms to control or regulate the pressurization of the laboratory 100 (or airlock 200) when the doorway D is closed, and when the doorway D is open and the additional airflow A1' is provided to the laboratory 100 (or from the airlock 200). The room pressurization control routine 400 may utilize: (a) a high flow feedback control algorithm 410; (b) a low flow feedback control algorithm 420; (c) pressure feedback algorithm 430; and (d) a damper controller 440 to control and regulate the operation of the air delivery system 102 and exhaust 104. In particular, each of the control algorithms 410, 420 and 430 operate to control the position of the damper 110 (and 210 if applicable) to thereby regulate the flow of air, and ultimately the pressure, within the laboratory 100 (and airlock 200 if applicable). However, only one of the three control algorithms 410, 420 and 430 will be selected by the damper controller 440, the selected control algorithm, in turn, determines the position of the damper 110 (and/or 210) during any given time or selection period. For example, the high and low flow feedback control algorithms may utilize and monitor the relative or differential air flows (e.g., the difference between air flows A1, and exhaust air flow E1) within the laboratory 100 in an effort to control or regulate the pressure P1 and or P1'. Similarly, the pressure feedback algorithm 430 may utilize pressure measurements and a pressure set point as a basis for controlling the relative air flows between the air flow A1 and the exhaust air flow E1 within the laboratory 100 in an effort to control or regulate the pressure P1.

The feedback algorithms 410, 420 and 430 can be incremental feedback algorithms configured to cooperate with the damper controller 440 achieve a bumpless transfer between the different controls schemes or mechanisms operating to control the pressurization of the laboratory 100. In operation, the incremental feedback algorithms or controller may be utilized to determine the incremental change in the position, based on or accounting for the current position, of the damper 110 necessary to produce a desired feedback result.

In operation, the high flow feedback control algorithm 410 includes a high flow limit 412 and the low flow feedback control algorithm 420 includes a low flow limit 422. The high and low flow limits 412, 422 can be calculated as a function of, e.g., a change or offset from, the exhaust air flow E1. Thus, when the doorway D is closed and the additional airflow A1' is not present; the high and low flow limits 412, 422 do not control the air pressure within the laboratory 100. In other words, the absence of the additional airflow A1' indicates that the laboratory 100 is completely sealed, i.e., leakproof, thereby allowing the room pressurization control routine 400 to operate normally between the high and low flow limits 412, 422.

The normal or sealed operation of the room pressurization control routine 400 will typically default to pressure control that operates independently from the high and low flow feedback control algorithms 410 and 420, and utilizes pressure feedback algorithm 430. The pressure feedback algorithm 430 operates the damper to drive the measured room pressure 434 to the desired pressure set point 432.

When, for example, the doorway D is open and the additional airflow A1' is present, the room pressurization control routine 400 operating under the control of the pressure feedback algorithm 430 directs the damper 110 to close in an effort to counterbalance the additional higher-pressure air flowing into the laboratory 100 and increasing the pressure therein. The controlled closing of the damper 110 approaches or reaches the low supply limit 422 and places the room pressurization control routine 400 under the control of the low flow feedback control algorithm 420. When the doorway D closes, and the additional airflow A1' disappears, the drop in air flow indicates to the room pressurization control routine 400 that the damper 110 should be open. The opening of the damper 110 shifts the control of the room pressurization control routine 400 away from the low supply limit 422 and the low flow feedback control algorithm 420, and back to the pressure feedback algorithm 430.

The room pressurization control routine 400 in this exemplary embodiment operates by allowing each of the three feedback functions: (a) the high flow feedback control algorithm 410; (b) low flow feedback control algorithm 420; and (c) pressure feedback algorithm 430; to operate as though it controls the position and operation of the damper 110. In particular, each of the three algorithms 410, 420 and 430 calculates an adjustment signal and/or an incremental adjustment signal 416, 426 and 436 necessary to satisfy the flow limits 412, 422 and the set point 432, respectively. The incremental adjustment signals 416, 426 and 436 may be utilized to physically drive or position of the damper 100 in an attempt to achieve or satisfy the flow limits 412, 422 and the set point 432 associated with the three algorithms 410, 420 and 430, respectively. While these three algorithms 410, 420 and 430 typically operate in a parallel manner to calculate the incremental adjustment, typically only one of the flow limits 412, 422 and the set point 432 can be satisfied by the execution of the incremental adjustment in any given time interval.

The damper controller 440 functions to select one of the three incremental adjustment signals 416, 426 and 436 to be applied to the damper 110. The selection has the effect of identifying which of the flow limits 412, 422 and the set point 432 operating within the room pressurization control routine 400 is satisfied during a given adjustment or time period. The damper controller 440, in turn, utilizes the selected incremental adjustment signal 416, 426 and 436, and adds the selected signal to a previously calculated damper command 446. The damper command 446 may, in turn, be communicated to the damper 110 thereby commanding the damper to increase or restrict the air flow A1 based on the requirements of the room pressurization control routine 400.

Figure 4:
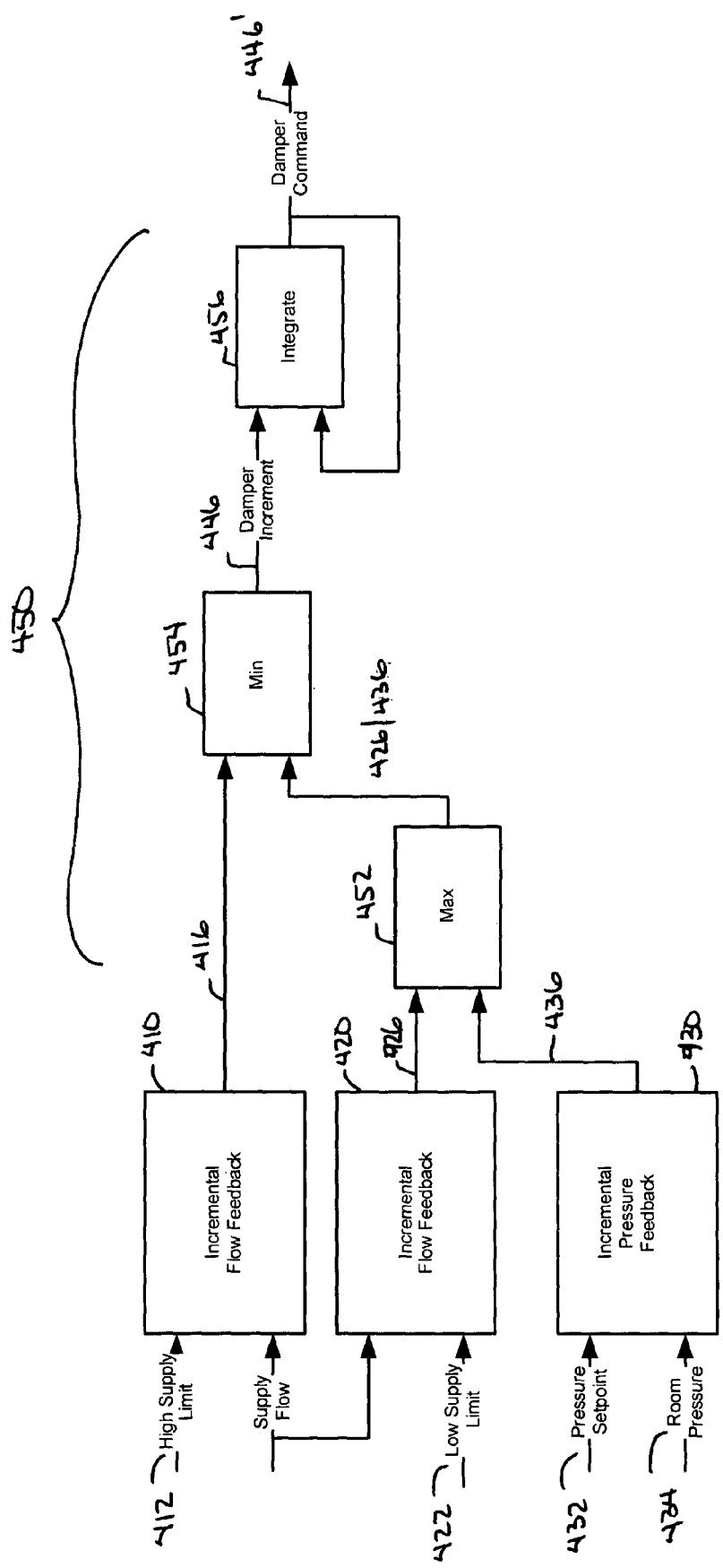
FIG. 4 illustrates a detailed block diagram of the control scheme shown in FIG. 3.

FIG. 4 illustrates another representation of the damper controller 440 configured to execute and cooperate with the room pressurization control routine 400. The damper controller 440 in this representation has been replaced with the individual structural or operational components generally identified by the reference numeral 450. The control damper 450 includes: (i) a maximum function selector 452, (ii) a minimum function selector 454; and (iii) an integrator 456. The maximum function selector 452 communicates with the low flow feedback control algorithm 420 and the pressure feedback algorithm 430. The maximum function selector 452 chooses between low flow feedback control algorithm 420 and the pressure feedback algorithm 430 based on the relative values of the incremental adjustment signal 426, 436 provided by each algorithm. The selected incremental adjustment signal 426, 436 may then be communicated to the minimum function selector 454 for further processing prior to communication to the integrator 456 that calculates the new damper command 446'. For example, the most positive (or least negative) incremental damper adjustment signal 426, 436 is selected. Thus, when the room pressurization control routine 400 operates significantly above the low flow limit 422, e.g., when the doorway D is closed and the additional airflow A1' is absent, the most positive signal will typically be the incremental adjustment signal 436 associated with the pressure feedback algorithm 430. The incremental adjustment signal 426 associated with the low flow feedback control algorithm 420 is likely to be negative as it attempts to engage the low flow limit 422 and substantially close the damper 110.

When the doorway D opens and the additional airflow A1' is present, the pressure feedback algorithm 430 is likely to generate an extremely negative incremental adjustment signal 436 in an attempt to close the damper 110. This reduces the air flow A1 in an attempt to allow or force the exhaust air flow E1 to evacuate the room of air to thereby lower the overall pressure of the laboratory 100. As the air flow A1 approaches the low flow limit 422, the incremental adjustment signal 426 generated by the low flow feedback control algorithm 420 is likely to be less negative than the incremental adjustment signal 436. The maximum function selector 452 selects or passes signal 426 and the low flow feedback control algorithm 420 takes control, regulating or driving the flow A1 to the low flow limit 422. While the doorway D remains open, the room pressure within the laboratory 100 remains higher than the set point 432, and the incremental adjustment signal 436 from the pressure feedback algorithm 430 remains low, and unselected by the maximum function selector 452.

The minimum function selector 454 operates symmetrically or in parallel with the maximum function sector 452. For example, at air flow A1 rates near or above the high flow limit 412, the minimum function selector 454 selects the incremental adjustment signal 416 generated by the high flow feedback control algorithm 410, particularly if the room pressure is low. At air flow A1 rates significantly below the high flow limit 412, the minimum function selector 454 selects one of the incremental adjustment signals 426, 436 provided by the maximum function sector 452 that correspond to either the low flow feedback control algorithm 420, or the pressure feedback algorithm 430, respectively. An integrator 456, in turn, combines the selected incremental adjustment signal 416, 426 or 436 with the existing damper command 446 to derive or calculate an updated damper command 446' that includes the selected incremental adjustment signal 416, 426 or 436.

A. Single Controlled Space Embodiment

The room pressurization control routine 400 and building layout 10 disclosed and discussed above generally describe one embodiment of a pressure control system for use in a highly-sealed leakproof environment. The disclosure below provides an additional example of the disclosed pressure control system.

Consider the laboratory 100 maintained at the pressure P1 by the room pressurization control routine 400, and positioned adjacent to airlock 200 which is controlled or maintained at the higher, e.g., less negative, pressure P2. When the doorway D between them is sealed, allowing little or no flow between the spaces, and the laboratory 100 is also sealed to all other adjacent spaces, e.g., the airlock 200 and environs 300, and then the exhaust air flow E1 and air flow A1 are (nearly) equal. Since the high flow limit 412 is well above the exhaust air flow E1 measured or calculated flow rate and the low flow limit 422 is well below the exhaust air flow E1 measured or calculated flow rate, the pressure feedback algorithm 430 operates or controls the damper 110, and finds the damper position that settles the laboratory pressure at the set point 432.

When the doorway D opens the additional air flow A1' flows into the laboratory 100 from the airlock 200. The doorway D opening is so large that the pressures P1 and P2 equalize almost instantly. Initially, a new pressure P1' is established for the two spaces 100 and 200. The new pressure P1' lays between the original pressure levels P1 and P2 of the separate spaces 100 and 200. After that, maintenance of the new pressure P1' or return to the desired pressure P1 depends on how the air delivery systems 102, 202 and exhaust systems 104, 204 in the two rooms 100, 200, respectively, respond.

For the purpose of illustrative example, assume the higher pressure space, i.e., the airlock 200, remains effectively at the pressure P2 throughout the event. As soon as the doorway D opens, the pressure P1 in the laboratory 100 increases to P1' to compensate for the pressure P2 provided by the airlock 200. (An initial gust through the doorway D supplies the air needed to raise the pressure.) The pressure P1' is higher than the pressure set point 432, so the pressure feedback algorithm 430 responds, moving the damper 110 towards the closed position. As the damper 110 closes in response to the incremental adjustment signal 436 provided by the pressure feedback algorithm 430, the air flow A1 decreases and no longer balances the exhaust air flow E1.

The additional air flow A1' through the doorway D develops to make up the flow difference caused by the closing of damper 110. (For this case, we disregard the effect on the other space, assuming that pressure is constant.) In other words, the reduction air flow A1 is compensated by the additional air flow A1' through the doorway D, so even though the damper 110 moves toward closed, and the air flow A1 through the duct 112 decreases, the laboratory 100 pressure remains at the pressure P1' instead of the desired or controlled pressure P1.

As the air flow A1 continues to be reduced, the measured or sensed flow approaches or passes the low flow limit 422 established for the laboratory 100. When the flow approaches or passes the low flow limit 422, the damper controller 440 ceases relying upon the pressure feedback algorithm 430 switches to the low flow feedback control algorithm 420 associated with the low flow limit 422. If the doorway D remains open long enough, the room pressurization control routine 400 may stabilize the laboratory 100 at the pressure P1', or even P1, such that the exhaust air flow E1 is maintained at its original rate, the air flow A1 is maintained at the low flow limit 422, and the additional air flow A1' provided via the doorway D equals to the difference between the exhaust air flow E1 and air flow A1 at the low flow limit 422. This condition may be maintained indefinitely, and could continue until the doorway closes.

When the doorway D closes, the additional air flow A1' is blocked or otherwise shut-off. The exhaust air flow E1 in the absence of the additional air flow A1' exceeds the supply provided by air flow A1 at the low flow limit 422, so the laboratory 100 pressure drops from P1' toward the set point 432 (corresponding to the pressure P1) and potentially well beyond it. As the pressure P1 in the laboratory 100 approaches the set point 432, the incremental signal 436 provided by the pressure feedback algorithm 430 increases, quickly exceeding the incremental signal 426 provided by the low flow feedback control algorithm 420. The damper controller 440, in turn, selects the incremental signal 436 provided by the pressure feedback algorithm 430, and the room pressurization control routine 400 returns to a pressure-based control mode.

If the laboratory 100 were to be connected to a lower pressure space or airlock 200 by a doorway D that opens and seals, a symmetrical set of events takes place. In other words, if the pressure differential between the laboratory 100 and the air lock 200 were reversed (i.e., P2 is was at a lower pressure than P1, and the additional air flow A1' was from the laboratory 100 to the air lock 200), then the high flow feedback control algorithm 420 would operate in a manner similar, albeit in an opposite direction, to the low flow feedback control algorithm 420. Thus, in a case or situation where the relative pressures are reversed, the high flow limit 412 goes in and out of action when the door opens and closes in stead of the low flow limit 422.

B. Multiple Control Spaces Embodiment

For simplicity, the preceding discussion assumed that the pressure P2 in the adjacent airlock 200 is constant, without considering why or what air flow A2 and air flow exhaust E2 is required to bring that about. Now consider that the airlock 200 is operated by the same room pressurization control routine 400 operating within the laboratory 100.

Initially, each of two rooms 100, 200 operates at its pressure set point, and between its respective flow limits. When the doorway D between the two room 100, 200 opens, the two rooms 100, 200 quickly equalize at a mechanically determined pressure level P1' which is between the two original pressures P1 and P2. At this moment, the laboratory 100 or first room is above its set point 432 and the airlock 200 or second room is below its set point. The room pressurization control routines 400 start working in opposite directions, the second routine 400 opens the damper 210 and the first routine closes the damper 110. Opening the damper 210 increases the air flow A2 in the airlock 200, and closing the damper 110 reduces the air flow A1 the laboratory 100. For each room 100, 200, the additional air flow A1' through the doorway D balances the difference between the air flow A1, A2 and air flow exhaust E1, E2. However, increasing air flow A1' through the doorway D results. The trend continues until one of the rooms 100, 200 approaches a flow limit. The damper controllers 114, 214 in the room 100, 200 that approaches the flow limit then switches to one of the flow feedback control algorithms 410, 420 while the other room 100, 200 continues to operate under the pressure feedback algorithm 430. The two rooms 100, 200 remain linked via the doorway D; they have the same pressure level P1' and the opposite flow offset, balanced by the additional air flow A1' through the doorway D. At this point, the room 100, 200 that encountered the flow limit determines the flow rate of the additional air flow A1' through the doorway D. It is the difference between the exhaust flow and the flow limit within the room 100, 200 that encounter the flow limit. The other room determines the common pressure level for the adjoined spaces, in this example; it is the original pressure set point for that space.

By selecting the high and low flow limits on the adjacent spaces, a ventilation designer may determine which room hits the flow limit first, what the flow rate is through the doorway D, and at what pressure the connected rooms operate. The room with the wider flow limits is the one that retains pressure control. The room with the narrower flow limits matches the other space pressure, and draws air through the door at a rate determined by its flow limit.

In alternate system embodiments or configurations, the controller 114 may be configured or arranged to control or regulate the pressure and/or flow as described above at the exhaust 104 (and/or 204) in conjunction with, or as opposed to, the air delivery system 102. Moreover, the air delivery system 102 and the exhaust 104 may include multiple air supply input and/or outputs that can be or regulated to generate and maintain a desired pressure within a room. For example, if a system included three (2) air supply inputs 108 each providing and air flow A1, two of the inputs 108 could be related via a flow control algorithm, while the third input 108 could be regulated by a pressure control algorithm.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A pressurization control system configured to regulate air pressure within a space, the system comprising:
   an air supply source fluidly coupled to a damper;
   a room controller configured to provide an incremental control signal to the damper, the room controller includes:
      a flow controller configured to generate a flow feedback signal; and
      a pressure controller configured to generate a pressure feedback signal, wherein the pressure feedback signal is generated independent from the flow feedback signal;
   wherein the room controller is configured to:
      generate a flow control signal based on the flow feedback signal and a pressure control signal based on the independently generated pressure feedback signal; and
      generate the incremental control signal as a function of the generated flow control signal without the generated pressure control signal in a first condition and as a function of the generated pressure control signal without the generated flow control signal in a second condition.

2. The system of claim 1, wherein the room controller selects the flow control signal or the pressure control signal to be the control signal provided to the damper.

3. The system of claim 1, wherein the flow controller comprises:
   a first feedback controller configured to generate a high flow feedback signal; and
   a second feedback controller configured to generate a low flow feedback signal.

4. The system of claim 1, wherein the pressure controller is configured to generate the pressure feedback signal in response to a pressure set point and a room pressure measurement.

5. The system of claim 2, wherein the pressure controller is configured to generate the pressure feedback signal in response to a pressure set point and a room pressure measurement.

6. The system of claim 1, wherein the room controller is configured:
   to generate the incremental control signal based on the flow feedback signal provided in response to a transient condition; and
   to generate the incremental control signal based on the pressure feedback signal provided in response to a steady-state condition.

7. The system of claim 1, wherein the room controller is an incremental room controller.

8. The system of claim 1, wherein the flow controller is an incremental flow controller.

9. The system of claim 1, wherein the pressure controller is an incremental pressure controller.

10. The system of claim 1, wherein the room controller is programmed with a high flow limit and a low flow limit established to control a flow output of the supply source via the damper.

11. A pressurization control system comprising:
    an air supply source fluidly coupled to a damper;
    a first space fluidly coupled to the air supply source;
    a second space selectively coupled to the first space, wherein fluid communication between the first and second spaces defines a transient condition;
    a room controller configured to provide an incremental control signal to the damper, the room controller includes:
       a flow controller configured to generate a flow feedback signal; and
       a pressure controller configured to generate a pressure feedback signal, wherein the pressure feedback signal is generated independent from the flow feedback signal;
    wherein the room controller is configured to generate a first incremental control signal based on the flow feedback signal without the pressure feedback signal provided in response to the transient condition, and a second incremental control signal based on the independently generated pressure feedback signal without the flow feedback signal, and
    wherein the room controller is configured to select the first incremental control signal to be the incremental control signal provided to the damper during a first time period and select the second incremental control signal to be the incremental control signal provided to the damper during a second time period.

12. The system of claim 11, wherein the flow controller comprises:
    a first feedback controller configured to generate a high flow feedback signal; and
    a second feedback controller configured to generate a low flow feedback signal.

13. The system of claim 12, wherein the pressure controller is configured to generate the pressure feedback signal in response to a pressure set point and a room pressure measurement.

14. The system of claim 11, wherein the pressure controller is configured to generate the pressure feedback signal in response to a pressure set point and a room pressure measurement.

15. The system of claim 11, wherein the room controller is configured:
   to generate the incremental control signal based on the flow feedback signal provided in response to the transient condition; and
   to generate the incremental control signal based on the pressure feedback signal provided in response to a steady-state condition.

16. The system of claim 11, wherein the room controller is an incremental room controller.

17. The system of claim 11, wherein the flow controller is an incremental flow controller.

18. The system of claim 11, wherein the pressure controller is an incremental pressure controller.

19. The system of claim 11, wherein the room controller is programmed with a high flow limit and a low flow limit established to control a flow output of the air supply source via the damper.

20. A method of pressure control comprising:

connecting an air supply source to a space;

coupling a damper to the air supply source;

generating a flow feedback signal;

generating a pressure feedback signal, wherein the pressure feedback signal is generated independent from the flow feedback signal;

determining a flow control signal based on the flow feedback signal and a pressure control signal based on the independently generated pressure feedback signal; and generating an incremental control signal as a function of the flow control signal without the pressure control signal in a first condition and as a function of the pressure control signal without the flow control signal in a second condition; and controlling the damper with the generated incremental control signal.

* * * * *